(12) United States Patent
Lewis et al.

(10) Patent No.: US 7,083,375 B2
(45) Date of Patent: Aug. 1, 2006

(54) SYSTEM AND METHOD FOR TRANSPORTING AND HANDLING BULK QUANTITIES OF BULK FEED

(75) Inventors: Joseph Michael Lewis, Arlington, NE (US); Ricky Allen Stock, Lincoln, NE (US); Chad Allen Conard, Ft. Calhoun, NE (US); Billy Franklin Gwaltney, Moravia, IA (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 10/034,983

(22) Filed: Dec. 27, 2001

(65) Prior Publication Data

US 2003/0123961 A1 Jul. 3, 2003

(51) Int. Cl.
*B65G 67/48* (2006.01)

(52) U.S. Cl. ............... 414/809; 414/359; 414/371; 414/576

(58) Field of Classification Search ........... 414/355, 414/356, 359, 360, 371, 372, 573, 574, 576, 414/809
See application file for complete search history.

(56) References Cited

U.S. PATENT DOCUMENTS

| | | | |
|---|---|---|---|
| 213,016 A | 3/1879 | Walker | |
| 894,759 A | 7/1908 | Stevens | |
| 1,407,926 A * | 2/1922 | Case | 414/361 |
| 1,496,196 A * | 6/1924 | Auld et al. | 299/19 |
| 1,735,022 A * | 11/1929 | Strauss | 414/360 |
| 1,770,503 A | 7/1930 | Williams | |
| 2,552,186 A * | 5/1951 | Koehler et al. | 414/576 |
| 2,877,722 A | 3/1959 | Peat | 105/377 |
| 2,967,733 A | 1/1961 | Amerine | 296/98 |
| 3,275,169 A | 9/1966 | Sabin et al. | 214/55 |
| 3,330,225 A | 7/1967 | Barry | 105/377 |
| 3,373,829 A | 3/1968 | Suman et al. | 177/132 |
| 3,741,128 A | 6/1973 | Flowers | 105/377 |
| 3,957,456 A * | 5/1976 | Verschuur | 44/280 |
| 3,984,289 A | 10/1976 | Sustarsic et al. | 202/262 |
| 3,993,203 A * | 11/1976 | Bartley | 414/360 |
| 4,043,467 A | 8/1977 | Hand, Jr. | 214/52 |
| 4,143,760 A | 3/1979 | Hallstrom | 198/750 |
| 4,508,211 A | 4/1985 | Foster | 198/750 |
| 4,531,877 A * | 7/1985 | Carroll | 414/372 |
| 4,625,654 A | 12/1986 | Kuss et al. | 105/377 |
| 4,659,275 A * | 4/1987 | Goodwin | 414/137.9 |

(Continued)

OTHER PUBLICATIONS

"Bins & Bunkers", Keith Walking Floor.com,(undated), pp. 1-2. http://www.keithwalkingfloor.com/page3.html (Continued)

*Primary Examiner*—James W. Keenan
(74) *Attorney, Agent, or Firm*—Cargill, Incorporated

(57) ABSTRACT

A system and method for handling and transporting moist bulk grain by-products include a rail car having an aluminum car body carried by a plurality of trucks for engaging rails. A flexible top cover, supported by a plurality of breakaway curved ribs, is positioned over an open top of the rail car to protect the moist bulk grain by-products carried therein. The car body has a front end and a rear end each having a wind screen for spoiling or deflecting the flow of air over the car as it moves to prevent the flexible top cover from being lost or damaged. The car may be emptied by a car inverter over a conveyor, such as a reciprocating floor which carries the moist grain by-products to a mixer, or transportation vehicles for distribution to customers or users of the grain by-products.

19 Claims, 8 Drawing Sheets

U.S. PATENT DOCUMENTS

| | | | | |
|---|---|---|---|---|
| 4,823,707 | A | 4/1989 | Salsbury et al. | 105/377 |
| 4,823,708 | A | 4/1989 | Wymer et al. | 105/377 |
| 4,859,485 | A | 8/1989 | Linton et al. | |
| 4,992,281 | A | 2/1991 | Linton et al. | |
| 5,017,077 | A | 5/1991 | Dowden | 414/360 |
| 5,046,912 | A * | 9/1991 | Bostrom et al. | 414/358 |
| 5,181,474 | A | 1/1993 | Miller | 105/355 |
| 5,474,354 | A | 12/1995 | Beale | 296/100 |
| 5,487,584 | A | 1/1996 | Jespersen | 296/100 |
| 5,549,347 | A | 8/1996 | Anderson | 296/98 |
| 5,575,595 | A | 11/1996 | Smoot | 406/39 |
| D387,308 | S | 12/1997 | Dahlin et al. | |
| 5,762,002 | A | 6/1998 | Dahlin et al. | 105/377.02 |
| 5,924,758 | A | 7/1999 | Dimmer et al. | 296/98 |
| 6,244,191 | B1 * | 6/2001 | Lydic | 105/377.07 |
| 6,250,233 | B1 | 6/2001 | Luckring | 105/377.01 |

OTHER PUBLICATIONS

"Bulk Terminal Services" Pacific Coast Terminals Co. Ltd., Apr. 16, 2001, pp. 1-4 http://www.sultran.com/PCTServices.htm.

"Keith Material Handling Technology", Brochure from Keith Walking Floor Manufacturing Company.

"Railcar Dumper", Ridley Terminals, Apr. 16, 2001, pp. 1-3 http://www.rti.ca/dumper.htm.

"Railcar Dumping Systems", Brochure from Hely & Patterson Inc.

Roderick, "Rotary Railcar Dumper & Train Positioner on the Teton Short Line" Apr. 16, 2001, pp. 1-10 http://www.net/users/tetonsl/railroad/dumper.htm.

"Rotary Coal Dumpers", Berlet Electronic Ltd., Dec. 12, 2001, pp. 1-2 http://www.berlet.com/belp12e.html.

"Rotary Railcar Dumpers and Train Positioners" Apr. 16, 2001, pp. 1-3 http://www.ida.net/users/tetonsl/railroad/svedala.jpg.

Stationary rotary car dumper type BPC (VRS)-93-110 and BPC(VCR)-134M), Apr. 16, 2001, pp. 1-4 http://www.vazhmash.com.ua/001/001.b.htm.

Brent C. Harris, "Feed Facility Operations On Track," AMG, Inc., Single source Solutions, Autumn 2001, pp. 103, (www.amg.eng.com).

"Tarps Direct," Flatbed "Factory Direct" Catalog, Burcher from Shur-Co (pp. 1, 12, 13, 30, 31, 32, 33). (www.shurco.com).

Klopfenstein, T. and Grant, R., "Use of Corn Coproducts in Beef and Dairy Rations," $62_{nd}$ *Minnesota Nutrition Conference & Minnesota Corn Growers Association Technical Symposium*, Sep. 11-12, 2001, Bloomington, MN, p. 8.

Klopfenstein, T., and Grant, R., "Feeding Wet Distillers and Gluten Feed to Ruminants," $54^{th}$ *Minnesota Nutrition Conference & National Renderers Technical Symposium*, Sep. 20-22, 1993, Bloomington, MN, p. 53.

Shaver, R.D., "By-Product Feedstuffs in Diary Cattle Diets in the Upper Midwest," *Forage Resources & Information*, 6 pages.

Coltrain, D., "Economic Issues with Ethanol," *Risk and Profit Conference, Kansas State University*, Aug. 16-17, 2001, Manhattan, KS, pp. 1-22.

Lalman, D., "Alternative Feeds for Beef Cows and Stockers," *Beef Cattle Handbook*, BCH-5057, pp. 1-5.

Bernard, J.K., et al., "Effect of Wet or Dry Corn Gluten on Nutrient Digestibility and Milk Yield and Composition," *J. Dairy Sci.*, vol. 74, No. 11, 1991, p. 3914.

Davis, K.S., "Corn Milling, Processing and Generation of Co-Products," *Minnesota Nutrition Conference*, Minnesota Corn Growers Association, Technical Symposium, Sep. 11, 2001, 7 pages.

Kaiser, R.M., "Utilizing the Growing Local Supply of Distillers Grains," University of Wisconsin-Extension, reprinted from www.wisc.edu/dysci/uwex/nutritn/ pubs/KaiserDistillersGrains.pdt, on Sep. 2, 2005, 6 pages.

Klopfenstein, T., "Distillers Grains as an Energy Source and Effect of Drying on Protein Availability," *Animal Feed Science Technology*, vol. 60 (1996), pp. 201-207.

Lamp, G., "Go with Gluten," reprinted from http://beefmag.com/beef_go_gluten/ on Sep. 2, 2005, 2 pages.

Schroeder, J.W., "Corn Gluten Feed: Composition, Storage, Handling, Feeding and Value," reprinted from http://www.ext.nodak.edu/extpubs/ansci/diary/as1127w.htm on Sept. 2, 2005, 8 pages.

Wahlberg, M., "By-Product Feeds—Wet Corn Milling," Virginina Cooperative Extension, reprinted from http://www.ext.vt.edu/news/periodicals/livestock/aps-99_05/aps-0062.html, on Sep. 2, 2005, 2 pages.

* cited by examiner

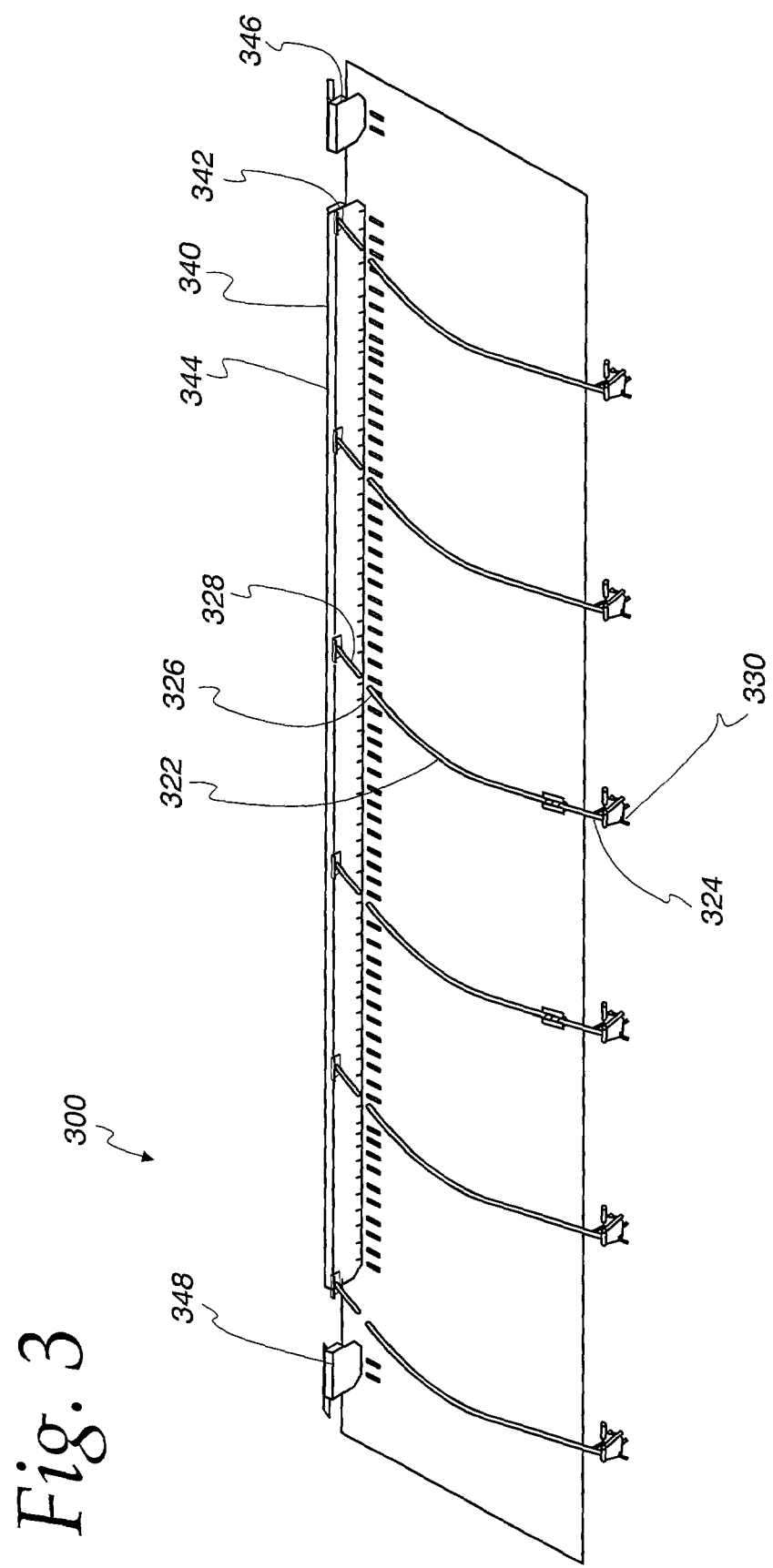

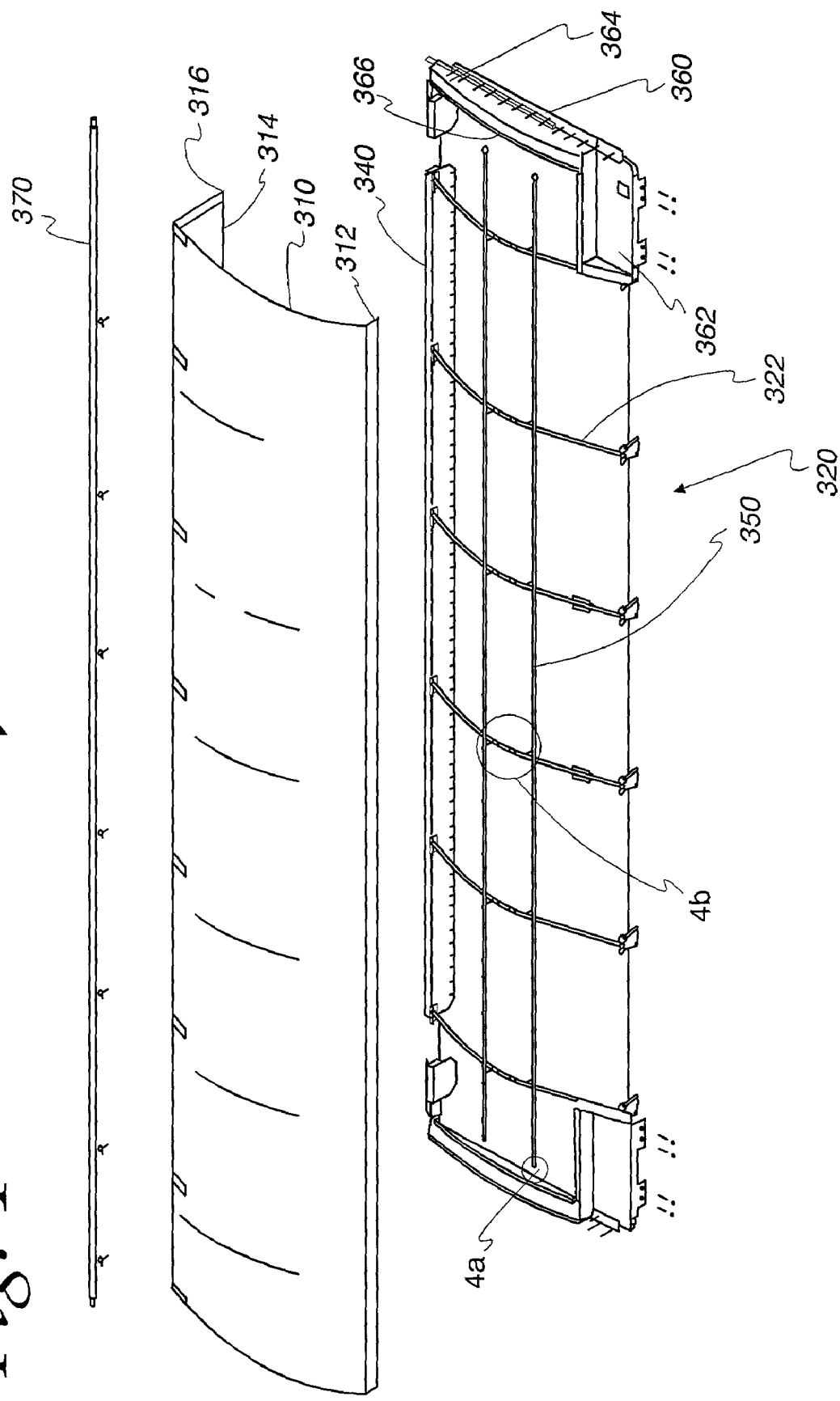

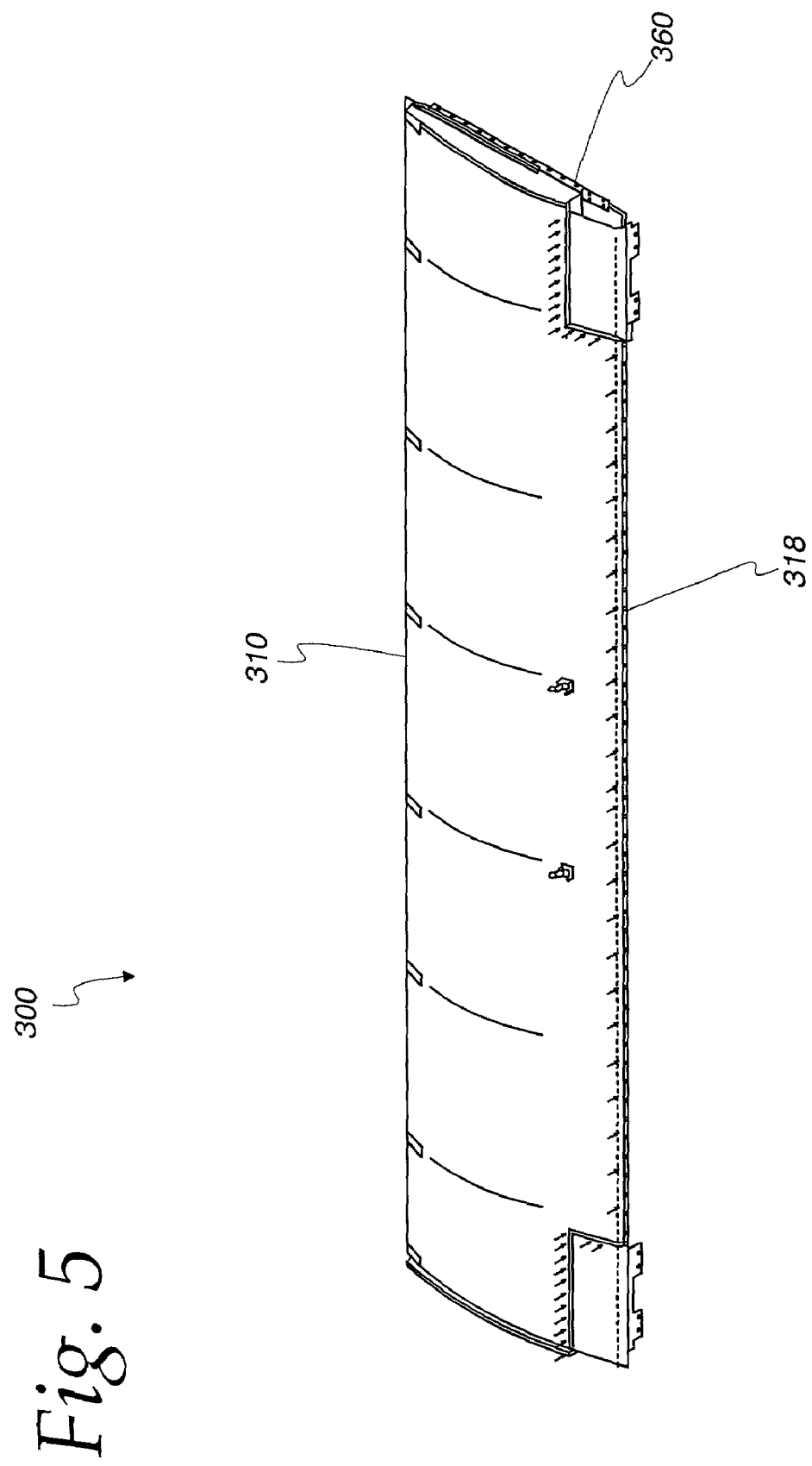

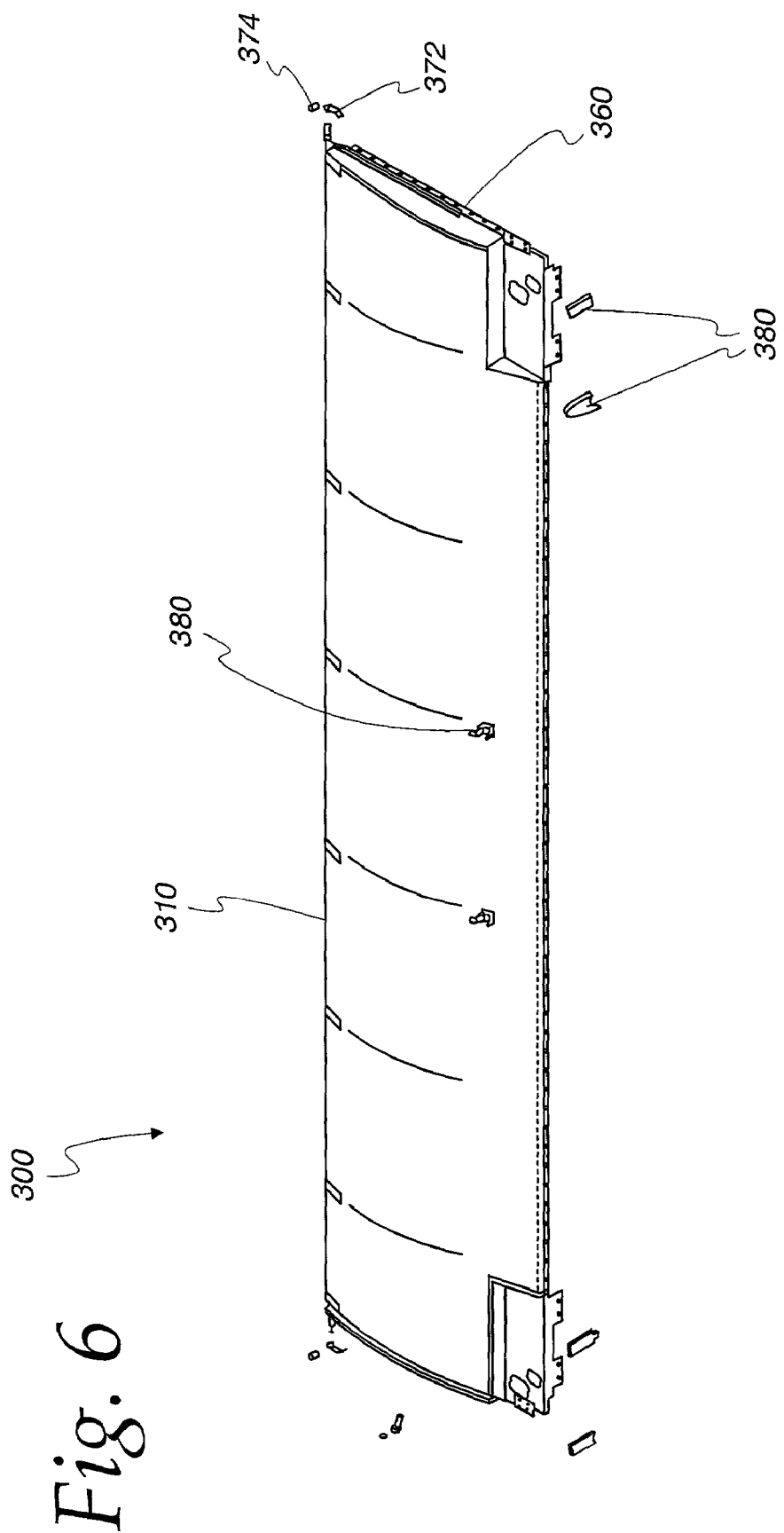

SYSTEM AND METHOD FOR TRANSPORTING AND HANDLING BULK QUANTITIES OF BULK FEED

BACKGROUND OF THE INVENTION

The invention relates to a system and method for handling moist bulk granular material and in particular to a system and method for handling and transporting moist animal feed.

It has been known in the feeding industry that it is desirable to provide cereal grain by-products, including moist corn gluten meal and/or corn gluten feed, to animals such as cattle to rapidly increase their weight and bring them to market early. Grain by-products are generally defined and described by the Association of American Feed Control Officials, Incorporated (2001, at page 243) and include, for example corn gluten feed. In the past it has been possible to supply moist grain by-products to animals if the animals were located in the vicinity of a corn processing plant. The moist grain by-products could be shipped by truck. This mode of transportation, however, is inefficient and costly, particularly if bulk quantities of moist grain by-products were being shipped over long distances. In addition, the likelihood that the shipment of moist grain by-products ending up being contaminated at the point of delivery increases significantly when shipped over long distances, such as thousands of miles. This is because the moisture in the product allows for the growth of microorganisms such as bacteria, fungi, yeast, and the like.

In the past in order to solve this problem, grain by-products have been dried and generally pelletized before shipping. The dried, pelletized product has an increased shelf life and the shipping costs are considerably reduced because water is not being shipped with the product. However, drying the product causes a significant decrease in nutritional value of the grain by-product feed to animals. This would be desirable to avoid. Hence, it would be desirable to ship a product that is not dried to ensure that the animals are fed a product that is high in nutritional value.

Investigations have been made as to whether conventional rail systems could be used to ship moist grain by-products. Unfortunately, most rail cars such as a hopper or coal car are designed in such a way that an unloading orifice or chute has a reduced cross-section. This reduced cross-section would tend to restrict the flow of moist material, such as the instant moist grain by-products, out of the car. With moist grain by-products, it would be almost impossible to empty such a car having a restricted chute. The moist product would stick and clog the orifice or chute. If a coal car was used to haul moist grain by-products, and dumped using a standard coal-type receptacle, this also would contemplate a very deep hole with very narrow cone-like receptacles used to receive coal. These systems would not work, if at all, with moist grain by-products.

Further, the high moisture content of the moist grain by-products (which generally is from about 30 to about 70 percent weight), together with a relatively acid pH of the meal, would cause an uncoated or unlined steel car coal car to corrode. This corrosion would cause the moist product to stick onto the rough corroded interior surface of the car, as well as potentially contaminate the grain by-product.

What is needed then is a system for shipping and handling a moist perishable product, such as moist grain by-products over long distance while maintaining the product in substantially stable uncontaminated condition to maintain its nutritional value.

SUMMARY OF THE INVENTION

This invention is directed to a method of supplying a bulk quantity of moist grain by-products using an invertible railroad container or car which is capable of being inverted and unloaded into containers below the grade of the inverted railroad container or car without uncoupling adjacent railroad cars. The container or body of the car is supported by a plurality of trucks or wheel assemblies for engagement with rails. The method of the invention also contemplates unloading the bulk quantity of moist grain by-products to road transport containers which are effective for distributing the moist grain by-products to customers and/or users of the by-products or to locations not served by rail.

In one aspect, the invertible railroad container or car has an aluminum body so that it will not corrode. In another aspect, an invertible railroad container or car may have a steel body which is lined with an extremely durable coating, such as an epoxy coating which resists abrasive wear to protect the body from corrosion. It is important that the car does not corrode for product integrity, such that rust and scale do not contaminate the product being hauled. It also is important that the interior of the car be smooth, stay smooth and retain a proper coefficient of friction between the interior surface of the railroad car and moist grain by-products over time, such that the moist product will not stick or be retained by the railroad car when it is inverted.

In order to distribute moist grain by-products economically, the rail system of the invention includes using invertible railroad containers or cars to transport the moist grain by-products and which will not have the moist product stick thereto during inverting and unloading. In an important aspect, the railroad container or car is covered, such as with a tarp, to maintain feed purity, maintain the moisture content of the feed within a desired range of from about 30 to about 70 weight percent and maintain the resulting nutritional value of the grain by-products. The cover over the product also protects the product from the contamination from soil, rain, snow and other contaminants.

Wind screens, which may be semi-circular in shape, are located at least at the front end of the car, and in another aspect at the front and the rear end of the aluminum railroad car body. The wind screens protect the flexible cover or tarp over the moist bulk feed from being displaced and/or lifted by air rushing over the railroad car when the car is in motion. A wind screen at each end of the car and facing the direction of travel will ensure that the car need not be uncoupled or realigned. With two wind screens, one wind screen will always face the direction of travel.

A plurality of flexible ribs or bows are used to support the flexible cover in a convex fashion over the moist feed within a car body and help prevent moisture being collected on the tarp. Because an aluminum car body may lack the strength of a steel car body, the aluminum body may be prone to being pulled inward during the inversion of the car and unloading. The moist feed also may hang up in the car because the tarp bows may hold product in the car when the car is being dumped. To prevent stress or a load from being transferred from the tarp bows to the walls of the car (tending to pull them inward) and to prevent catastrophic mechanical failure of the bows themselves, one end of each bow is designed to sever from its attachment point to the car body to permit the flow of material out of the car. In one aspect, at least one end of each of the ribs attached to the upper portion of the car body is easily severable from the car body. This is so that when the railcar is inverted for unloading the ribs do not support the weight of the moist feed which would tend to pull the walls of the railroad car inward.

In order to continuously transport the moist feed from the railroad car after it has been inverted, the moist feed is loaded onto a moving conveyor. In one aspect, a reciprocating floor arrangement will be positioned beneath the unloading area of the railroad car to move the moist feed to a conveyor. The conveyor or reciprocating floor then will carry the moist by-products to road transport containers or trucks which are effective for distributing the by-products to customers or users of the feed, or to one or more mixing tanks where the feed may be mixed and then may be dispensed to trucks for distribution.

The invention also contemplates and permits the minimization of permanent on-site storage facilities for feed or moist grain by-products, both at the production point where the feed is produced and at the receiving point where the feed is received from the railroad cars. With two trains having about 50 or more cars as described herein with one train unloading at the receiving point and one train loading at the production point with a week or less train-transit time between the receiving and production points, considerable savings result in practicing the invention because of the lower cost of rail shipping versus truck shipping and because the invention is effective for permitting all of the by-product production being stored in the train cars as described herein, both at the production and receiving points. The invention permits storage of the grain by-products at the production point without any special "fast loading" equipment with delivery of the by-product at a rail-end or receiving point without any permanent storage silos at the receiving point. In one aspect, less than about a one week supply of feed needs to be stored in plastic bags as a buffer in the event of a rail delay.

It is a principal object of the present invention to provide a system and method for transporting moist bulk grain by-products by rail without by-products being contaminated or the nutritional value being reduced.

It is another object of the present invention to provide a system and method for transporting moist bulk grain by-products which can quickly and conveniently unloaded in large quantities for immediate transport to customers and users of the grain products or to locations not served by rail.

It is another object of the invention to transport in large quantities of moist grain by-products without prolonged storage in separate containers which are not located on the railroad car or trucks.

Other aspects of the present invention will become obvious to one of ordinary skill in the art upon review of the following specification and claims in light of the accompanying drawings.

BRIEF DESCRIPTION OF THE DRAWINGS

FIG. 3 is a perspective view of a tarp assembly for the rail car, illustrating support framework;

FIG. 4 is a perspective view of the tarp assembly, illustrating the support framework and a tarp;

FIG. 5 is a perspective view of the tarp assembly;

FIG. 6 is a perspective view of the tarp assembly, illustrating the tarp in a closed position.

DETAILED DESCRIPTION OF THE INVENTION

Figure 1:
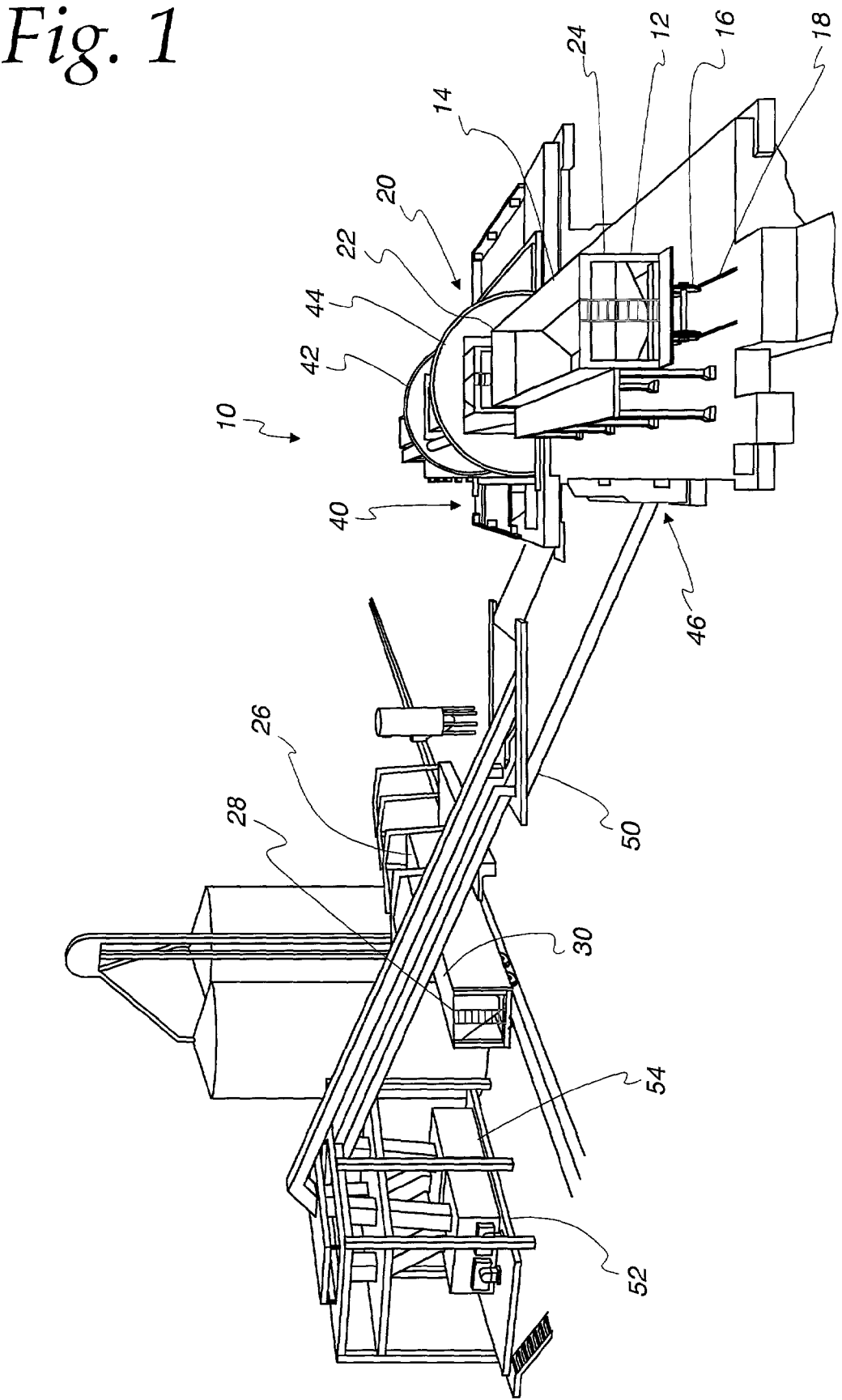
FIG. 1 is a perspective of a system for handling and transporting wet feed embodying the present invention.
Figure 2:
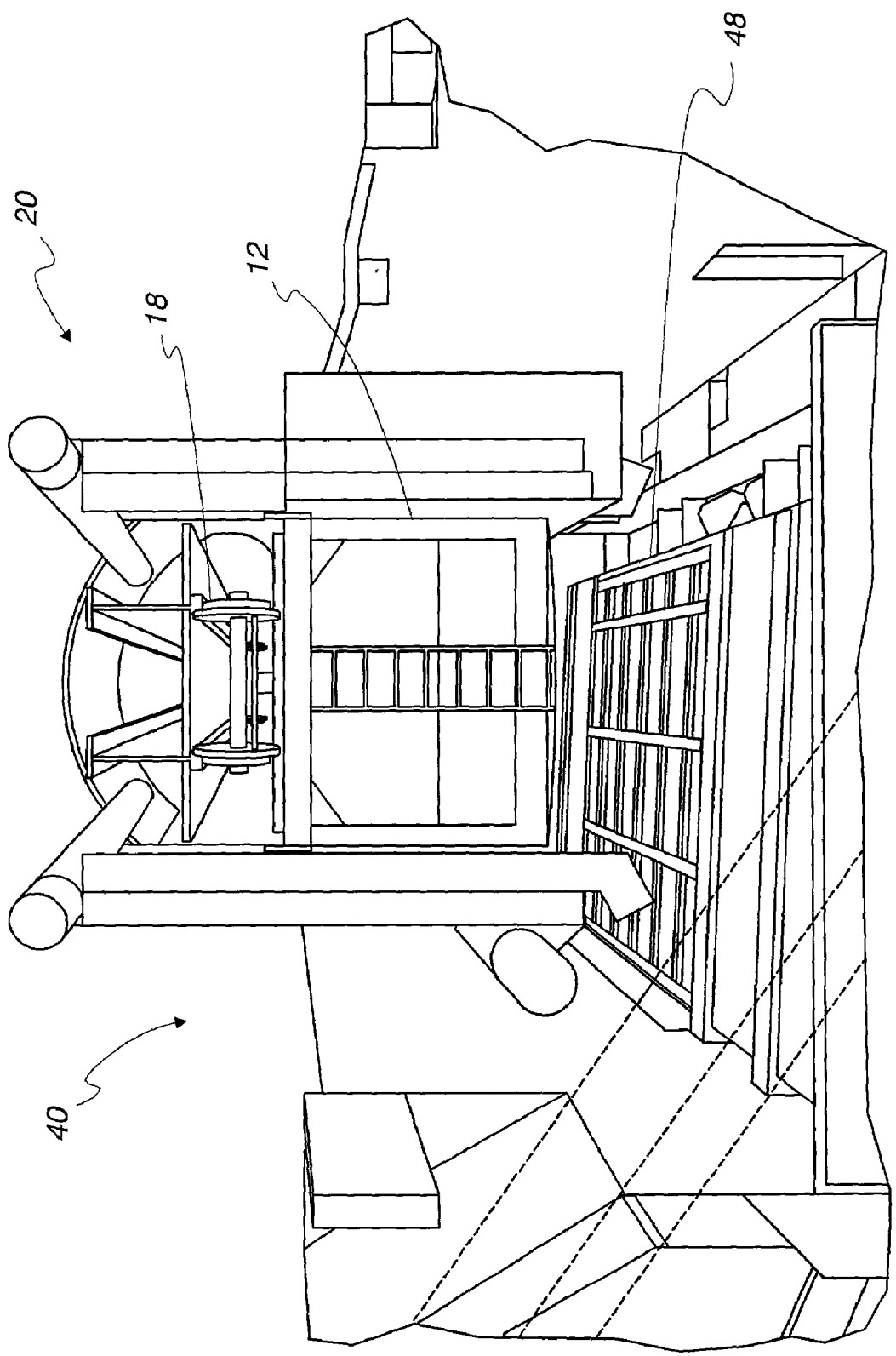
FIG. 2 is a perspective view partially in section of the system shown in FIG. 1, showing a rail car positioned inverted within a rail car inverter.

Referring now to the drawings and especially to FIG. 1, a system for handling and delivering moist bulk feed is shown therein and generally identified by reference numeral 10. The system 10 includes an invertible railroad car 12 having a railroad car body 14 preferably comprised of aluminum. The car body 14 can receive and hold feed during shipment, preferably a moist grain by-product. These moist grain by-products include, by way of example, aspirated grain fractions, brewers dried grains, buckwheat middlings, condensed distillers solubles, condensed fermented corn extractives with germ meal bran, corn bran, corn flour, corn germ meal (wet and dry milled), corn gluten feed, corn gluten meal, corn grits, corn distillers dried grains, corn distillers dried grains/solubles, corn distillers dried solubles, grain sorghum distillers dried grains, grain sorghum distillers grains/solubles, grain sorghum distillers dried solubles, grain sorghum flour, barley distillers dried grains, barley distillers dried grains/solubles, barley distillers dried solubles, barley flour, wheat distillers dried grains, wheat distillers dried grains/solubles, wheat distillers dried solubles, wheat flour, hominy feed, malt sprouts, oat groats, oatmeal feed, pearl barley by-products, peanut skins, rice bran, rice polishings, rye middlings, sorghum grain flour gelatinized, sorghum grain flour partially and partially aspirated gelatinized, wheat bran, wheat shorts, wheat germ meal, wheat germ meal defatted, wheat middlings, wheat mill run, and wheat red dog. The aluminum body resists the corrosive effects of the moist grain by-product which is loaded into the car body. By-products, such as corn gluten feed, typically have a pH of about 4.0 to about 4.5, which together with the high moisture content of the corn gluten feed, would tend to corrode a steel car. A plurality of trucks 16 is connected to the railroad car body 14 and supports the railroad car body 14 over a pair of rails 18, as may best be seen at an unloading station 20, shown in FIG. 1.

The railroad car body 14 includes a front end 22 and a rear end 24, with a front end wind screen 26 and a rear end wind screen 28 respectively positioned thereon. The wind screens 26 and 28 disrupt the flow of air over the car body 14 when the railroad car 12 is being moved. The wind screen facing the direction in which the car is to move (i.e., facing the flow of oncoming air) is effective for reducing displacement of a flexible cover 30 as air rushes over the cover 30 when the railroad car 12 moves. At the production facility, the moist grain by-products may be loaded onto the uncovered car with a conveyor to a distant site for loading onto a truck for further transport to a site remote from the rail facility, such as a feed lot.

The railroad car inverter 40 includes a pair of arcuate members 42 and 44 for rotatably supporting other portions of the car inverter 40 and the railroad car 12. The tarp 30 is removed from the loaded railroad car 12. The car inverter 40 then receives the railroad car 12 loaded with moist grain by-product in clamping fashion and rotates it at least about 120 to about 180 degrees to upend the car 12 to allow the moist bulk feed to drop into a feed unloading area 46. The car inverter 40 avoids problems with feed clogging that would occur with a typical hopper car. In addition the car 12 may be unloaded without uncoupling it from other cars on a train.

At a bottom portion 46 of the unloading area is a reciprocating floor 48 for delivery of the moist bulk feed from the railcar body 14 to a conveyor assembly 50. The reciprocating floor as describe in U.S. Pat. No. 4,508,211 may be used, the disclosure of which patent is incorporated by reference herein. The conveyor assembly 50 carries the moist bulk feed to trucks or like vehicles for immediate delivery to customers or users. The conveyor may also transport the feed to a processing station which may include a pair of mixers 52 and 54 for mixing the feed before loading the feed onto a truck. The conveyor 50 conveys the meal or feed to the mixer at a rate of about 1,000 ton per hour.

While the feed may be stored in storage compartments, such as plastic bags, tanks or silos, where it will be available for shipment via truck or the like, in one aspect the method and system of the invention generally contemplates moving the grain by-products from production facility, then by rail and then by truck to an end user or customer without storage. Further, the system and method embodying the present invention provide convenient transport of large quantities of feed, in particular moist corn gluten feed without losing the nutritional properties of the feed or contaminating or losing any feed along the way.

FIGS. 3–7 illustrate a tarp assembly 300 for protecting the feed within the railroad car 12 in accordance with aspects of the invention. The tarp assembly 300 also assists in maintaining feed purity by retaining moisture within the interior of the railroad car 12. The tarp assembly 300 includes the flexible cover 30, which may comprise a selectively retractable tarp 310 for covering the open top of the railroad car 12 and protecting the load therewithin from the elements, such as moisture, wind, and dirt or other debris. The tarp 310 protects the load from contamination, prevents product from being blown from the car while being transported and prevents a loss of the nutritional properties of the moist by-products. The tarp 310 is movable between an open position, wherein access to the interior of the railroad car 12 is permitted, and a closed position, wherein the open end of the railroad car 12 is covered by the tarp 310.

Figure 4A:
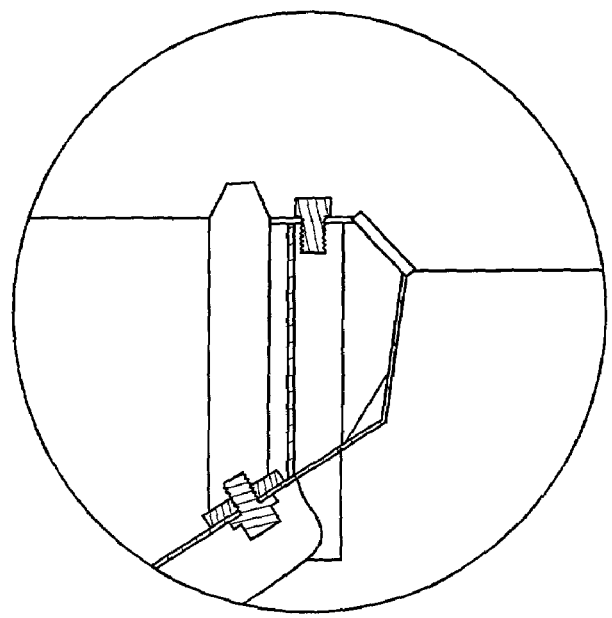
FIG. 4a is an enlargement of a portion of the perspective view shown in FIG. 4.
Figure 4B:
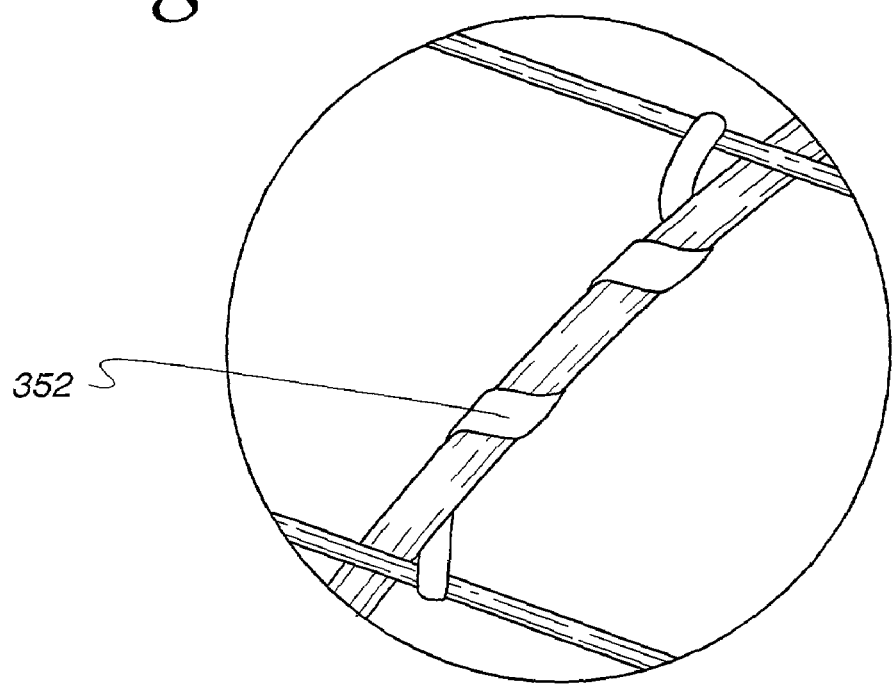
FIG. 4b is an enlargement of a portion of the perspective view shown in FIG. 4.

As illustrated in FIGS. 3 and 4, the tarp assembly 300 includes a supporting frame assembly 320 for supporting the tarp 310 when in its closed position covering the open end of the railroad car 12. The supporting frame assembly 320 comprises a plurality of rib members 322 for extending between longitudinal sides of the railroad car 12. A first end 324 of each rib member 322 is pivotably attached to a bracket member 330, mounted along the top surfaces of the railroad car 12. A second end of each rib member 326 is hollow and slidably fitted over a rib shank member 328 attached relative to the top surfaces of the railroad car 12, opposite the bracket members 330, as will be described further hereinbelow.

The rib shank members 328 are fixed to longitudinally extending frame members 340, extending substantially the length of the railroad car 12. The rib and rib shank members 322 and 328 are bowed in a convex manner between the sides of the railroad car 12 and have an apex approximately in the center of the railroad car 12. The convex bowing of the rib and rib shank members 322 and 328 is effective to prevent moisture from collecting on the tarp 300 thereover. Any moisture on the closed tarp 300 may be directed over the sides of the railroad car 12 by the convex shape imparted to the tarp 300 by the rib and rib shank members 322 and 328.

Extending parallel to the longitudinal sides of the railroad car 12 and between the midsections of the rib members 322 are a pair of ridge straps 350, as shown in FIG. 4, for supporting the tarp 310 between the rib members 322. The ridge straps 350 are secured to the rib members 322 with ridge strap retainers 352. The ridge strap retainers 352 wrap around the rib members 322 and between the pair of ridge straps 350 to maintain the spacing between the ridge straps 350. In one aspect of the invention, the ridge straps 350 and ridge strap retainers 352 are formed of nylon, although other materials may be equally suitable.

Attached at opposite ends 22 and 24 of the railroad car 12 to the upper surfaces thereof are a pair of pan assemblies 360. The pan assemblies 360 are substantially L-shaped, as illustrated in FIG. 4. Each pan assembly 360 includes a horizontally oriented flat surface 362 positioned in a corner of the railroad car 12 for allowing the railroad car 12 to be contacted by the inverter 40 for dumping the load from the railroad car 12. The pair of pan assemblies 360 are configured so that their respective flat surfaces 362 are both positioned on the same side of the railroad car 12 for contacting by the inverter 40.

The pan assemblies 360 each also include an arcuate portion 364 that extends upwardly and along the respective end of the railroad car 12. The wind screens 26 and 28 may comprise wind screens 366 attached along the top of the arcuate portion 364 of each pan assembly 360 to restrict air from moving beneath the tarp 310 in its closed position and lifting the tarp 310 relative to the frame assembly 320. The wind screens 366 are placed on each of the pan assemblies 360 to ensure that air is restricted from flowing beneath the closed tarp 310 regardless of the direction of travel of the railroad car 12.

The tarp 310 is sized to extend between the sides and ends of the railroad car 12 to cover the open end thereof when the tarp 310 is in its closed position. The tarp 310 includes a first longitudinal edge 312 securable via a retainer strip 318 to the edge of the railroad car 12 having the brackets 330 attached thereto. The second longitudinal edge of the tarp 314, opposite the first edge 312, has lengthwise extending pocket 316 for receiving a rod 370.

Figure 7:
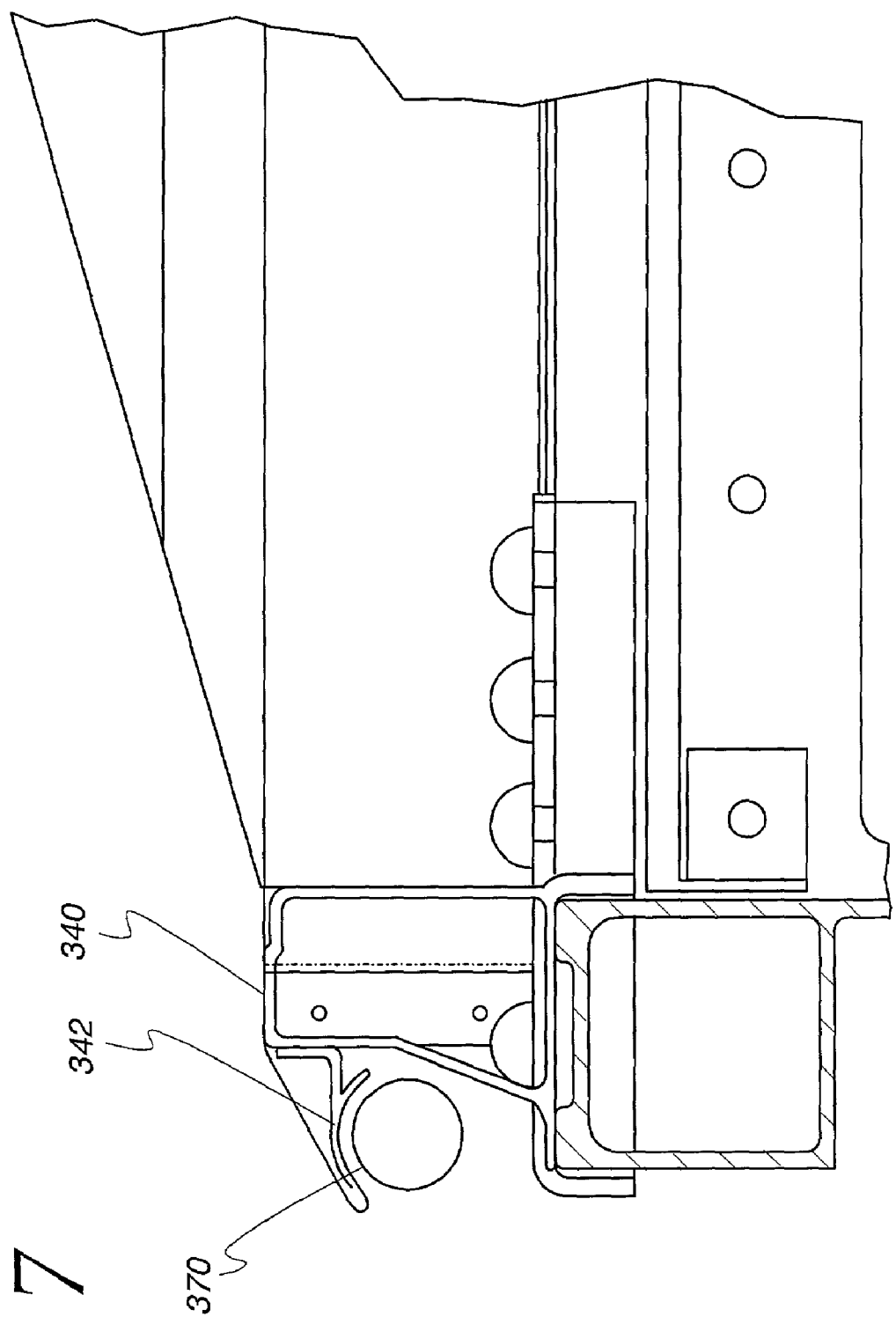
FIG. 7 is a partial section view of the rail car of FIG. 1, across the longitudinal axis thereof.

In the closed position, the tarp 310 covers the open end of the railroad car 12, as illustrated in FIGS. 5 and 6. As described above, the first edge 312 of the tarp 310 is secured to the edge of the railroad car 12. The second edge 314 is held in place by positioning the rod 370 within a semi-circular groove 342 formed in an outwardly facing surface of the frame members 340, as illustrated in FIG. 7. The frame members 340 include three portions, a middle portion 344 and a pair of end portions 346 and 348. The end portions 346 and 348 are space apart from the middle portion 344 to leave gaps for inverter 40 to contact the railroad car 12. The grooves 342 are formed in each of the middle and end portions 344, 346, and 348.

When the rod 370 is seated in the groove 342, a locking member 372 may be used to secure the rod 370 therein and prevent inadvertent removal of the rod 370 and thus the tarp 310. The locking member 372 has an aperture 374 through an end thereof for insertion of an end of the rod 370. Once the rod 370 is inserted into the aperture 374 of the locking member 372, the locking member 372 is secured relative to the respective pan assembly 360, such as by wedging in a slot formed therein. The locking members 374 are provided at both ends of the rod 370.

When the tarp 310 is in the closed position, the configuration of the tarp assembly 300 is such that it does not significantly protrude, if at all, beyond the perimeter edges of the railroad car 12. Accordingly, the frame members 340 and the pan assemblies 360 are sized to not significantly protrude beyond the perimeter edges of the railroad car 12. It can be desirable for the tarp assembly 300 to not significantly protrude beyond the perimeter edges of the railroad car 12 to ensure that the profile of the railroad car 12 remains within acceptable limits, as may be required by the railroads. The configuration of the tarp assembly 310 may also be effective to allow for retrofitting of existing railway cars, and to prevent interference between the tarp assembly 310 and the car inverter 40.

To move the tarp 310 to the open position from the closed position, such as for loading or dumping of the interior of the railroad car 12, the locking members 372 are first removed from the ends of the rod 370. Next, the rod 370 is rotated to roll the tarp 310 therearound. A winch or other mechanism may be provided to assist in rolling the tarp 310 around the rod 370. For this purpose, the ends of the rod 370 may be splined for engagement with the winch mechanism. As the tarp 310 is wound around the rod 370, the rod 370 is moved toward the side of the railroad car 12 opposite the frame members 340.

The tarp 310 is not completely wound around the rod 370. Instead, the tarp 310 is wound around the rod 370 until the rod 370 abuts against stop members 380. The stop members 380, as illustrated in FIG. 6, are positioned to prevent the rod 370 and tarp 310 wound therearound from moving over the flat surfaces 362 of the pan assemblies 360, thereby assuring that the tarp 310 in its open position does not interfere with the operation of the inverter 40. The stop members 380 extend vertically from the pan assembly 360 and rib members 322. In one aspect, a pair of stop members 380 are attached to each pan assembly 360 and a pair of stop members 380 are attached to ribs members 322 located in the mid-section of the railroad car 12.

To empty the railroad car 12, the tarp 310 is moved to its open position, as described above. The inverter 40 may contact the railroad car 12 on the flat surfaces 362 of the pan assemblies 360 and between the middle and end portions 344, 346, and 348 of the frame members 340. The railroad car 12 may then be rotated to an upended position, allowing the load within the interior to fall therefrom. The load falls between the rib members 322 and the ridge straps 350, which preferably remain in place.

However, the slidable engagement of the rib members 322 to the rib shank members 328 allows the rib members 322 to move relative to the shanks 328, permitting limited movement of the rib members 322 in response to the load falling therepast. If the load exerts sufficient forces on the rib elements 322, some or all of the rib elements 322 may completely slide off of the rib shank members 328 and pivot about their hinge connection to the brackets 330 to a position out of the way of the falling load. Once the load is emptied from the railcar, any rib members 322 disengaged from their respective shank elements 328 can be replaced thereover.

In addition, the telescoping engagement between the rib and rib shank members 322 and 328 permits expansion and contraction therebetween to ensure that the members 322 and 328 extend between the sides of the railroad car 12. For example, when the railroad car 12 is empty, the engaged rib and rib shank members may be at first position relative to each other. As the railroad car 12 is loaded, the sides may tend to spread apart due to the weight of the load, requiring the rib and rib shank members 322 and 328 to telescopingly expend relative to each other. The spreading of the sides of the railroad car 12 may not be uniform. For example, after loading the distance between the sides of the railroad car 12 at the center may be greater than toward the ends thereof. In addition, the telescoping rib and rib shank members 322 and 328 are effective to reduce hang up of the moist by-product on the frame assembly 320 when the railroad car 12 is unloaded by upending it in a car inverter 40. This can prevent the aluminum car body 14 from being damaged during unloading in the car inverter 40 by the weight of the feed on the rib and rib shank members 322 and 328 pulling the sides of the aluminum car body 14 inward. Accordingly, the rib and rib shank members 322 and 328 may be configured to compensate for spanning variable distances between the sides of the railroad car 12.

While there has been illustrated and described a particular embodiment of the present invention, it will be appreciated the numerous changes and modifications where will occur to those skilled in the art, and is intended in the appended claims to cover all those changes and modifications which fall within the true spirit and scope of the present invention.

What is claimed is:

1. A method of supplying a bulk quantity of moist grain by-product using rail transport, the method comprising:
   loading a bulk quantity of moist grain by-product into an invertible railroad container to provide a railroad container which contains moist grain by-product;
   transporting the railroad container containing moist grain by-product; and
   inverting the railroad container with the grain by-product thereby removing the moist grain by-product from the inverted railroad container,
   wherein the moist grain by-product has a moisture content of about 30% to about 70% by weight.

2. The method of claim 1, further comprising:
   covering the moist grain by product in the railroad container; and
   uncovering the moist grain by-product in the railroad container prior to inverting the railroad container to remove the moist grain by-product.

3. The method of claim 2, further comprising covering the moist grain by-product with a tarp.

4. The method of claim 2, further comprising removing the moist grain by-product from the inverted railroad container to at least one grain moving device which is below a grade of the inverted railroad container.

5. The method of claim 4, further comprising transferring the moist grain by-product from the grain moving device to a transportation vehicle for distribution to users of the moist grain by-product.

6. The method of claim 1, wherein inverting comprises rotating the railroad container at least about 120 to about 180 degrees.

7. The method of claim 1, wherein the moist grain by-product is selected from the group consisting of corn gluten feed, corn gluten meal, corn grits, and wheat bran.

8. The method of claim 1, wherein the moist grain by-product is selected from the group consisting of corn gluten feed, corn distillers grains, distillers grains with solubles, and corn bran.

9. The method of claim 1, wherein the moist grain by-product comprises corn gluten feed.

10. The method of claim 1, further comprising: loading a bulk quantity of moist grain by-product into about 50 or more invertible railroad containers;
   arranging the railroad containers in a train of railroad containers;

transporting the train of railroad containers containing moist grain by-product; and inverting the railroad containers with the grain by-product thereby removing the moist grain by-product from the inverted railroad containers, wherein the moist grain by-product has a moisture content of about 30% to about 70% by weight.

11. The method of claim 10, wherein loading a bulk quantity of moist grain by-product into about 50 or more invertible railroad containers comprises filling each of the 50 or more invertible railroad containers with moist grain by-product.

12. A method of supplying a bulk quantity of moist cereal grain by-product using rail transport, the method comprising:

loading a bulk quantity of moist cereal grain by-product into an invertible railroad container to provide a railroad container containing cereal grain by-product;

covering the moist cereal grain by-product in the railroad container;

transporting the railroad container containing moist cereal grain by-product;

uncovering the moist cereal grain by-product in the railroad container in which the by-product was covered;

inverting the railroad container with the moist cereal grain by-product, thereby removing the moist cereal grain by-product from the railroad container; and removing the moist cereal grain by-product from the inverted railroad container onto a grain by-product moving device which is below a grade of the inverted railroad container, wherein the moist grain by-product has a moisture content of about 30% to about 70% by weight.

13. The method as recited in claim 12, further comprising transferring the moist cereal grain by-product from the grain moving device to a transportation vehicle for distribution to users of the moist cereal grain by-product.

14. The method as recited in claim 12, wherein the railroad container is aluminum and the covering of the moist cereal grain by-product is a flexible tarp.

15. The method of claim 12, wherein the moist cereal grain by-product is selected from the group consisting of corn gluten feed, corn gluten meal, corn grits, and wheat bran.

16. The method of claim 12, wherein the moist cereal grain by-product is selected from the group consisting of corn gluten feed, corn distillers grains, distillers grains with solubles, and corn bran.

17. The method of claim 12, wherein the moist cereal grain by-product comprises corn gluten feed.

18. The method of claim 12, further comprising:

loading a bulk quantity of moist cereal grain by-product into about 50 or more invertible railroad containers;

arranging the railroad containers in a train of railroad containers;

covering the moist cereal grain by-product in the railroad containers;

transporting the train of railroad containers containing moist cereal grain by-product;

uncovering the moist cereal grain by-product in the railroad containers in which the by-product was covered;

inverting the railroad containers with the moist cereal grain by-product, thereby removing the moist cereal grain by-product from the railroad containers; and removing the moist cereal grain by-product from the inverted railroad containers onto a grain by-product moving device which is below a grade of the inverted railroad containers, wherein the moist cereal grain by-product has a moisture content of about 30% to about 70% by weight.

19. The method of claim 18, wherein loading a bulk quantity of moist cereal grain by-product into about 50 or more invertible railroad containers comprises filling each of the 50 or more invertible railroad containers with moist cereal grain by-product.

* * * * *